G. P. Gordon.

Printing Press.

No. 1572. Reissued Nov. 24. 1863.

Witnesses

A. Turner

Sam Cummings

Inventor

Geo. P. Gordon by

Atkins, Doane, Attorneys.

UNITED STATES PATENT OFFICE.

GEORGE P. GORDON, OF BROOKLYN, NEW YORK.

IMPROVED PRINTING-PRESS.

Specification forming part of Letters Patent No. 14,016, dated January 1, 1856; Reissue No. 581, dated August 10, 1858; Reissue No. 1,572, dated November 24, 1863.

*To all whom it may concern:*

Be it known that I, GEORGE P. GORDON, of the city, county, and State of New York, have invented, made, and applied to use certain new and useful Improvements in the Construction and Operation of Printing-Presses; and I do declare the following to be a full, clear, and correct description of the same, reference being had to the accompanying drawings, making a part of this specification, and to the letters of reference marked thereon, in which—

Figure 2:
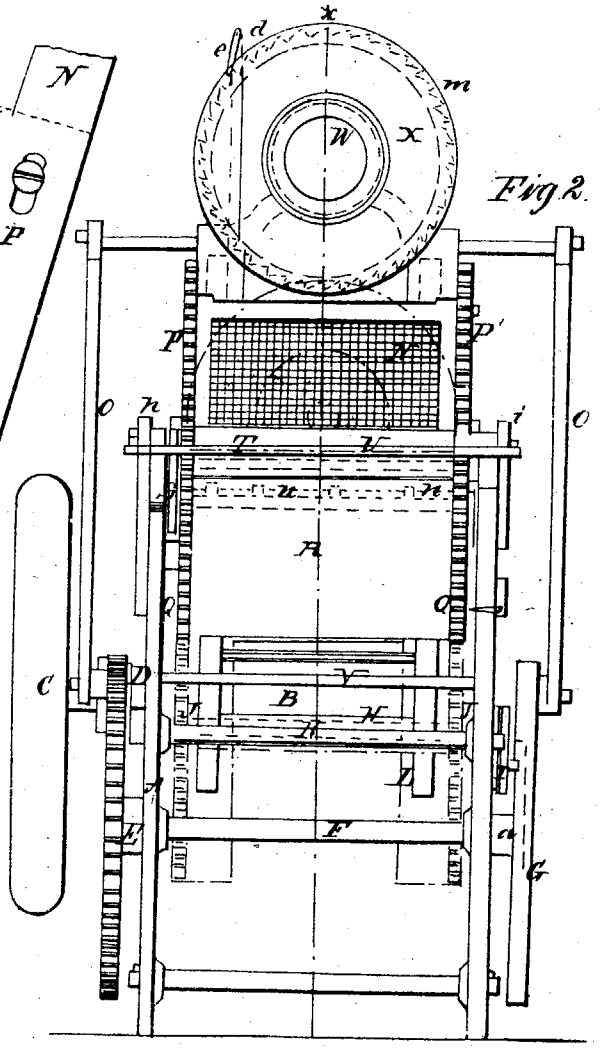
Figure 3:
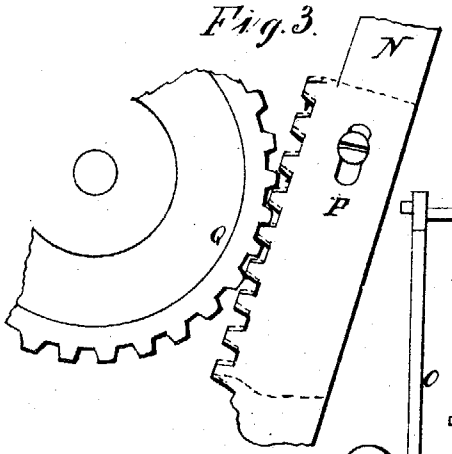
Figure 1:
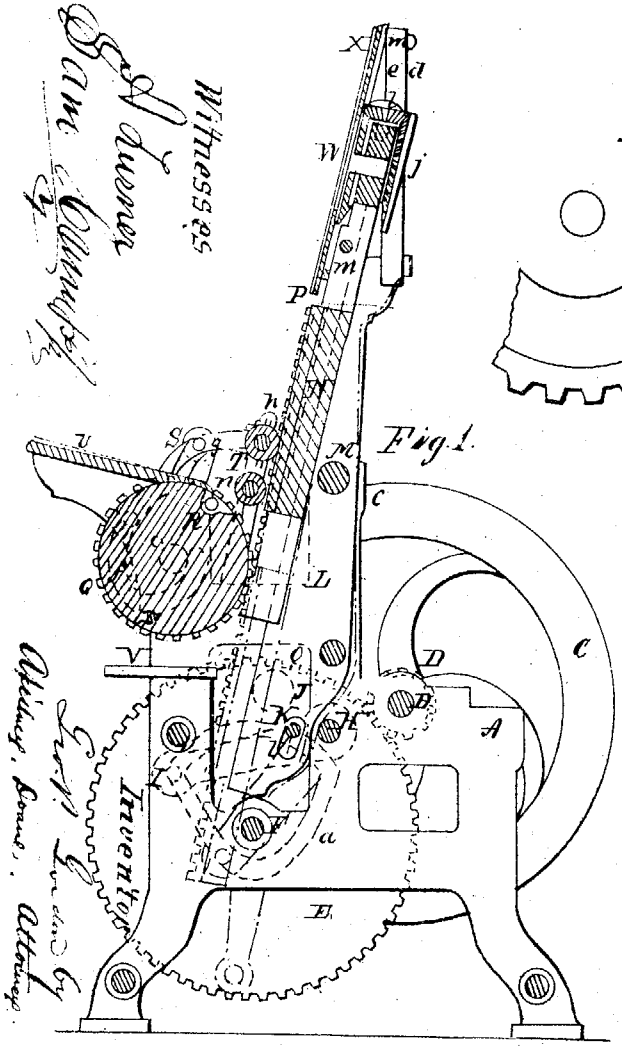

Figure 1 is a vertical sectional view of my improved printing-press; Fig. 2, a front elevation of the same; Fig. 3, a detached view of the toothed wheels on the cylinder or segment of a cylinder employed, and the racks upon the bed.

In the drawings like parts of the invention are designated by the same letters of reference.

The nature of my invention consists (*a*) in combining with a rotary disk an annular ring or outside disk, the two revolving each in an opposite direction to the other for the purpose of breaking up the ink, so that it shall, by such contrary motions, become evenly distributed and thus imparted to the inking-rollers; (*b*) in moving one or more of the rollers for inking the form from the parallel position they necessarily assume for this purpose to an oblique position, which shall give to them a lateral motion when in contact with the distributing-disks or equivalent, for the purpose specified; (*c*) in combining with a cylinder or segment of a cylinder, having a part revolution with a reciprocating movement, a bed which during its reciprocating movement alternately changes its motions—namely, first, traveling under and in contact with the cylinder or segment of a cylinder, to give an impression, then being withdrawn from contact with the cylinder or segment of a cylinder and remaining withdrawn during the return-movement to prevent an impression being taken, such bed alternating from one of these positions to the other, thus performing two separate and distinct motions, entirely independent of and in a contrary direction to each other, while remaining in gear with the cylinder or segment of a cylinder; (*d*) in attaching to the bed an adjustable as well as a stationary rack, which racks gear into toothed wheels upon the cylinder or segment of a cylinder, so that all wear or variation may be taken up by adjusting the movable rack and thus cause the cylinder or segment of a cylinder and the bed to work always in harmony with each other, thus insuring a sharp and clear impression and one free from slur; (*e*) in placing a reciprocating bed in a vertical position or in any given angle from a horizontal position, when said bed is combined with a rotating reciprocating cylinder or segment of a cylinder, which shall place or pile the printed sheets upon the pile-board, as hereinafter shown; (*f*) in using with a vibrating bed a rotating disk, for the purpose of distributing the ink; (*g*) in using with a vibrating bed a rotating disk surrounded by an annular ring or outside disk, the two revolving each in an opposite direction to the other, for the purpose of breaking up the ink; (*h*) in the use or employment of a rotating ink-distributing table in combination with an impression produced by a cylindrical surface.

To enable those skilled in the arts to make and use my invention, I will speak of its construction and operation.

A shows a frame for supporting the operative parts of my improved printing-press.

B is the driving-shaft of the press, having upon one end the fly-wheel C and at its opposite end the pinion D, gearing into the cog-wheel E upon the shaft F.

G shows a blank wheel upon the shaft F, which blank wheel G is provided with the cam *a*, which cam *a* serves to control the movements of the arm I for the purposes hereinafter shown.

H is a shaft to which is attached the arm I, provided with a stud and roller playing in the cam *a*. The shaft H has also the arms J J attached to it, and these arms J have a shaft, K, fitted in them, which shaft K passes through the slots *b* in the lower end of the swinging frame L, hung upon the shaft M.

*d* shows an upright provided with the pawl *e*, attached to the frame L, for the purpose of operating the ink-distributing tables W and X, as hereinafter described. N is the bed in which the form or types is placed, which bed N travels or moves upon guides or ways upon the swinging frame L. This bed N is connected by means of the connecting arms or rods *o o*, one at each side, to the cog-wheel E and the blank wheel G, the connecting arms or rods being attached to the same, as shown in Fig. 2.

P shows a stationary rack attached to one side of the bed N, and P′ is a rack attached to the other side of the bed N, said rack P′ being provided with slots, so that it may be readily adjusted, and thus compensate for and take up any wear or variation in either of the racks P and P′, and thus cause the cylinder or segment of a cylinder and the bed employed to always work in harmony with each other, which is of great importance in order that a sharp and clear impression and one free from slur may be obtained. These racks P and P′ gear into toothed wheels Q, attached one at each end of the cylinder or segment of a cylinder, R, the shaft of which cylinder or segment of a cylinder, R, works in proper bearings in the frame A. One of the toothed wheels Q is provided with the cam *f*, in which cam *f* the end of a lever, S, fitted with a stud and roller, plays. This lever S is pivoted to the frame A and is forked at one end so as to encompass one or more of the inking-rollers T, held in the uprights *h* and *i*, attached to the frame A, the upright *h* being provided with an oblong slot, as shown in Fig. 2.

U shows the feed table placed over the cylinder or segment of a cylinder, R, and V is the pile-table placed under the cylinder or segment of a cylinder, R.

W shows a circular disk attached at the top of the bed N and traveling with the same. This disk W is provided with a bevel-wheel, *j*, attached to its axis on its outer end. The plate W is encompassed by an annular disk, X, which has a bevel-geared rim, *k*, on its outer side, in which a pinion, *l*, gears, said pinion also gearing into the wheel *j* on the axis of the disk W. A rim, *m*, having ratchet-teeth cut in it, is also placed on the outer side of the disk X, near its periphery.

The cylinder or segment of a cylinder, R, is provided with nippers *n*, to take and hold the sheet of paper.

Operation: The two racks P and P′ bear one against the upper edges of the teeth of one wheel Q and the other rack against the under edges of the teeth of the other wheel Q, so that no play is allowed between the teeth of the racks P P′ and those of the wheels Q. The sheets of paper to be printed are fed upon the feed-table U, and the form or types is secured to the bed N. Motion is imparted to the shaft B and a reciprocating motion is communicated to the bed N by means of the connecting arms or rods *o o*, attached as shown in Fig. 2. When the bed N reaches its highest point, the lower end of the frame L, hung upon the shaft M, is thrown toward the cylinder or segment of a cylinder, R, by the shaft K, which shaft K receives its motion from the shaft H, the latter being operated by the arm I, provided with a stud and roller and playing in the cam *a*. The cylinder or segment of a cylinder, R, has a rotating reciprocating motion imparted to it by means of the racks P and P′ and toothed-wheels Q. The sheet of paper to be printed is taken from the feed-table U by the nippers *n* upon the cylinder or segment of a cylinder, R, and as it is carried around between the cylinder or segment of a cylinder and the form, an impression is given, and when the cylinder or segment of a cylinder has completed its part rotary movement, the nippers *n* are opened and the sheet by its own weight is deposited upon the pile-table V. Just before the bed N commences to move upward, the shaft K, fitted in the arms J, withdraws the frame L and bed N from the cylinder or segment of a a cylinder to prevent an impression being taken, the pawl E during this operation acting against the rim *m* and rotating the annular disk X a certain distance. The circular disk W is rotated a corresponding distance in an opposite direction by means of the gearing *j*, *k*, and *l*. The disks W and X may be supplied with ink from a proper fountain or by a hand-roller, and the rotation of the disks serves to distribute it (the ink) evenly upon the disks. As the bed N descends the disks W and X pass behind the rollers T, one or more of which are inked by contact with the disks W and X, and one or all of these rollers T may be thrown into an oblique position when in contact with the disks W and X by the lever S, operated by the cam *f*, this oblique vibratory movement causing the ink to be evenly distributed upon the rollers T.

Having thus fully described my invention, what I claim as new, and desire to secure by Letters Patent, is—

1. Combining with a rotating disk an annular ring or outside disk, the two revolving each in an opposite direction to the other, for the purpose of breaking up the ink, so that it shall by such contrary motions become evenly distributed and thus imparted to the inking-rollers.

2. Moving one or more of the inking-rollers from the parallel position they occupy for inking the form to an oblique position, which shall give to them a lateral motion when in contact with the distributing-disks or their equivalent, for the purpose specified.

3. Combining with a rotating reciprocating cylinder or segment of a cylinder, a bed which during its reciprocating movement alternately changes its motions, first traveling under and in contact with the cylinder or segment of a cylinder to give an impression, then being withdrawn from contact with the cylinder or segment of a cylinder and remaining withdrawn during the return-movement to prevent an impression being taken, such bed alternating from one of these positions to the other, thus performing two separate and distinct motions entirely independent of and in a contrary direction to each other, while remaining in gear with the cylinder or segment of a cylinder.

4. Attaching to a reciprocating bed an adjustable rack as well as a stationary rack, which two racks shall play into gear upon a cylinder or segment of a cylinder, so that any and all wear or variation may at once be taken up by adjusting the movable rack, and by this means always cause the bed and cylinder or segment of a cylinder to work in harmony with each other and produce a clear and sharp impression, free from slur.

5. Placing a reciprocating bed in a vertical position or in any given angle from a horizontal position, when said bed is combined with a rotating reciprocating cylinder or segment of a cylinder, which shall place or pile the printed sheets upon a pile-board, ~~as~~ herein described.

6. Using with a vibrating bed a rotating disk for the purpose of distributing the ink.

7. Using with a vibrating bed a rotating disk surrounded by an annular ring or outside disk, the two revolving ~~each~~ in ~~an~~ opposite direction to the other, for the purpose of breaking up the ink, as herein fully described.

8. The use or employment of a rotating ink-distributing table in combination with an impression produced by a cylindrical surface.

GEO. P. GORDON.

In presence of—
A. TURNER,
SAM. CRUMP, Jr.